United States Patent
Raptis et al.

(10) Patent No.: US 9,342,716 B2
(45) Date of Patent: May 17, 2016

(54) SOFTWARE-DEFINED MULTI-MODE RFID READ DEVICES

(75) Inventors: Mark Raptis, Valley Center, CA (US); Graham Ross, Poway, CA (US)

(73) Assignee: CareFusion 303, Inc., San Diego, CA (US)

( * ) Notice: Subject to any disclaimer, the term of this patent is extended or adjusted under 35 U.S.C. 154(b) by 781 days.

(21) Appl. No.: 12/700,645

(22) Filed: Feb. 4, 2010

(65) Prior Publication Data

US 2011/0187509 A1    Aug. 4, 2011

(51) Int. Cl.
   *H04Q 5/22* (2006.01)
   *G06K 7/10* (2006.01)

(52) U.S. Cl.
   CPC ........ *G06K 7/10128* (2013.01); *G06K 7/10356* (2013.01)

(58) Field of Classification Search
   CPC ............ G06K 7/0008; G06K 7/10356; G06K 7/10297; G06K 7/10336; G06K 7/10039; G06K 19/0723; G06K 2017/0045; G06Q 10/087; G06Q 10/08
   USPC .............. 340/10.1, 10.31–10.34, 10.5, 10.51, 340/572.1, 572.2, 572.4
   See application file for complete search history.

(56) References Cited

U.S. PATENT DOCUMENTS

| | | | | |
|---|---|---|---|---|
| 5,121,412 A | * | 6/1992 | Borth | 375/308 |
| 5,220,557 A | * | 6/1993 | Kelley | 370/345 |
| 5,220,583 A | * | 6/1993 | Solomon | 375/328 |
| 5,235,326 A | * | 8/1993 | Beigel et al. | 340/10.41 |
| 6,340,954 B1 | * | 1/2002 | Annamaa et al. | 343/895 |
| 6,894,614 B2 | * | 5/2005 | Eckstein et al. | 340/572.1 |
| 7,439,862 B2 | * | 10/2008 | Quan | 340/572.7 |
| 8,063,746 B2 | * | 11/2011 | Borcherding | 340/10.34 |

(Continued)

FOREIGN PATENT DOCUMENTS

| | | |
|---|---|---|
| CN | 101099185 A | 1/2008 |
| EP | 1840790 A2 | 10/2007 |

(Continued)

OTHER PUBLICATIONS

Finkenzeller: "RFID Handbook: Fundamentals and Applications in Contactless Smart Cards and Identification", pp. 309-315, 2003.*

(Continued)

*Primary Examiner* — Firmin Backer
*Assistant Examiner* — Nay Tun
(74) *Attorney, Agent, or Firm* — McDermott Will & Emery LLP

(57) ABSTRACT

Devices and methods for reading multiple types of RFID tags having different frequencies and/or encoding schemes are disclosed. One or more search signals covering a plurality of RFID bands are transmitted. A presence indication of an RFID tag in one of the plurality of RFID bands is detected. An interrogating signal having a carrier frequency tuned to a frequency at which the presence indication is detected is transmitted. A tag response signal comprising tag information associated with the RFID tag is received. A digital response signal based on the tag response signal is digital signal processed to obtain the tag information.

22 Claims, 7 Drawing Sheets

(56) References Cited

U.S. PATENT DOCUMENTS

| | | | |
|---|---|---|---|
| 2003/0142764 A1* | 7/2003 | Keevill et al. | 375/341 |
| 2005/0052283 A1* | 3/2005 | Collins et al. | 340/572.7 |
| 2005/0231367 A1* | 10/2005 | Bellantoni | 340/572.1 |
| 2006/0097874 A1 | 5/2006 | Salesky et al. | |
| 2006/0253511 A1* | 11/2006 | Abascal et al. | 708/270 |
| 2006/0261928 A1* | 11/2006 | Solberg et al. | 340/10.4 |
| 2006/0267733 A1* | 11/2006 | Steinke et al. | 340/10.1 |
| 2007/0096881 A1* | 5/2007 | Pillai | 340/10.51 |
| 2007/0206701 A1* | 9/2007 | Paley et al. | 375/295 |
| 2007/0236336 A1* | 10/2007 | Borcherding | 340/10.34 |
| 2007/0253468 A1* | 11/2007 | Pettersen et al. | 375/146 |
| 2008/0055164 A1* | 3/2008 | Zhang et al. | 343/702 |
| 2008/0238621 A1 | 10/2008 | Rofougaran et al. | |
| 2008/0272892 A1* | 11/2008 | O'Byrne et al. | 340/10.3 |
| 2009/0146792 A1 | 6/2009 | Sadr et al. | |
| 2009/0312056 A1* | 12/2009 | Drugge et al. | 455/561 |
| 2010/0013598 A1 | 1/2010 | Greene | |
| 2010/0137024 A1* | 6/2010 | Maguire | 455/552.1 |

FOREIGN PATENT DOCUMENTS

| | | | |
|---|---|---|---|
| JP | 2006105723 A | | 4/2006 |
| JP | 2006-157593 | | 6/2006 |
| JP | 2006-229433 | | 8/2006 |
| JP | 2006229433 A | * | 8/2006 |
| WO | WO-2006052867 A1 | | 5/2006 |
| WO | WO-2008118875 A1 | | 10/2008 |
| WO | WO-2008127993 A1 | | 10/2008 |

OTHER PUBLICATIONS

International Search Report and Written Opinion for PCT/US2011/022793 mailed Oct. 10, 2011.

Non-Final Notification of Reason(s) for Refusal issued by the Japanese Patent Office, dated Nov. 4, 2014.

Extended European Search Report dated Aug. 7, 2013 for European Application No. 11740205.7 in 6 pages.

Chinese Office Action in Chinese Patent Application No. 201180007967.7 dated Dec. 29, 2014, 13 pages (including English translation).

International Search Report and Written Opinion for Application No. PCT/US2011/022793, dated Oct. 10, 2011, 7 pages.

Russian Office Action for Application No. 2012129531, dated Jun. 5, 2015, 17 pages.

Australian Examination Report No. 1 for Application No. 2011213143, dated Sep. 9, 2015, 3 pages.

Chinese Second Office Action for Application No. 201180007967.7, dated Aug. 13, 2015, 26 pages.

Japanese Decision to Grant for Application No. 2012-552008, dated Aug. 4, 2015, 5 pages.

Taiwanese Office Action for Application No. 100119563, dated Sep. 23, 2015, 28 pages.

European Intention to Grant for Application No. 11740205.7, dated Aug. 13, 2015, 36 pages.

Chinese Third Office Action for Application No. 201180007967.7, dated Mar. 17, 2016, 9 pages excluding translation.

\* cited by examiner

SOFTWARE-DEFINED MULTI-MODE RFID READ DEVICES

FIELD

The present disclosure relates to radio-frequency identification (RFID) systems.

BACKGROUND

Conventional RFID devices operate on a single one of many possible frequencies and employ one of many different encoding schemes. For example, systems are currently available that operate at 125 kHz, 13.56 MHz, 915 MHz, and 2.4 GHz. The RFID tags that are attached to the items to be tracked operate at only a single frequency and, in addition, may use unique and incompatible encoding schemes to transmit data at that frequency.

Current RFID systems operate by coupling the antenna of transceivers or RFID readers to the antenna of one or more "tags" attached to the items that are to be tracked. Conventional RFID readers are designed to work only with the tags supplied by a particular supplier. Readers are not designed to universally read multiple types of RFID tags. This limitation of the current readers may be attributable to the hardware-based processing of the response signal and decoding of the tag information. Specific radio circuitry is used to sense the reflected information from the RFID tag, filter the information, and shape it before it is fed to the processor. Although this technique is rather straightforward, it lacks the flexibility to deal with tags of different types, e.g., tags based on different frequencies and/or encoding schemes.

SUMMARY

Embodiments described herein address the foregoing problems by providing a multi-mode RFID read device that is capable of handling different types of RFID tags having different target frequencies and/or encoding schemes.

Certain embodiments provide a method of reading RFID tags. The method can comprise transmitting one or more search signals covering a plurality of RFID bands. The method can further comprise detecting a presence indication of an RFID tag in one of the plurality of RFID bands. The method can further comprise reading the RFID tag.

Certain embodiments provide a method of reading RFID tags. The method can comprise transmitting one or more search signals covering a plurality of RFID bands. The method can further comprise detecting a presence indication of an RFID tag in one of the plurality of RFID bands. The method can further comprise transmitting an interrogating signal having a carrier frequency tuned to a frequency at which the presence indication is detected. The method can further comprise receiving a tag response signal from the RFID tag, the tag response signal comprising tag information associated with the RFID tag. The method can further comprise digital signal processing a digital response signal based on the tag response signal to obtain the tag information.

Certain embodiments provide an RFID read device. The device can comprise an antenna. The device can further comprise a processor configured to transmit one or more search signals covering a plurality of RFID bands via the antenna. The processor can be further configured to detect a presence indication of an RFID tag in one of the plurality of RFID bands. The processor can be further configured to read the RFID tag based on a response signal received from the tag. The tag response signal can comprise tag information associated with the RFID tag. The device can further comprise an analog-to-digital converter configured to produce a digital response signal based on the tag response signal. The processor can be further configured to digital signal process the digital response signal to obtain the tag information.

It is to be understood that both the foregoing summary and the following detailed description are exemplary and explanatory and are intended to provide further explanation of the embodiments as claimed.

BRIEF DESCRIPTION OF THE DRAWINGS

The accompanying drawings, which are included to provide further understanding of the invention and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the disclosed and claimed embodiments. It will be apparent, however, to one ordinarily skilled in the art that the embodiments may be practiced without some of these specific details. In other instances, well-known structures and techniques have not been shown in detail to avoid unnecessarily obscuring the disclosure.

The word "exemplary" is used herein to mean "serving as an example, instance, or illustration." Any embodiment or design described herein as "exemplary" is not necessarily to be construed as preferred or advantageous over other embodiments or designs.

The embodiments of the present disclosure address and solve problems of conventional RFID systems which normally can be employed with only a single type of RFID tags. The embodiments of the present disclosure provide a multi-mode RFID read device that is capable of handling multiple types of RFID tags based on different target frequencies (e.g., 125 kHz, 13.56 MHz, 915 MHz, and 2.4 GHz) and/or encoding schemes (e.g., ISO18000). This device employs a processor that performs in software at least some of the functions conventionally performed by dedicated single-frequency hardware components. Such functions may include, but are not limited to: generation and modulation of a carrier signal; and demodulation, filtering of a response signal from an RFID, and decoding of tag information. Certain embodiments of the multi-mode RFID read device are configured to demodulate and decode different RFID systems operating within the total bandwidth of its capabilities, handle multiple frequency RFID tags, and process any defined encoding algorithms. In addition, new frequencies and encoding schemes can be added to its capabilities by reprogramming the processor without making hardware modifications.

Figure 1:
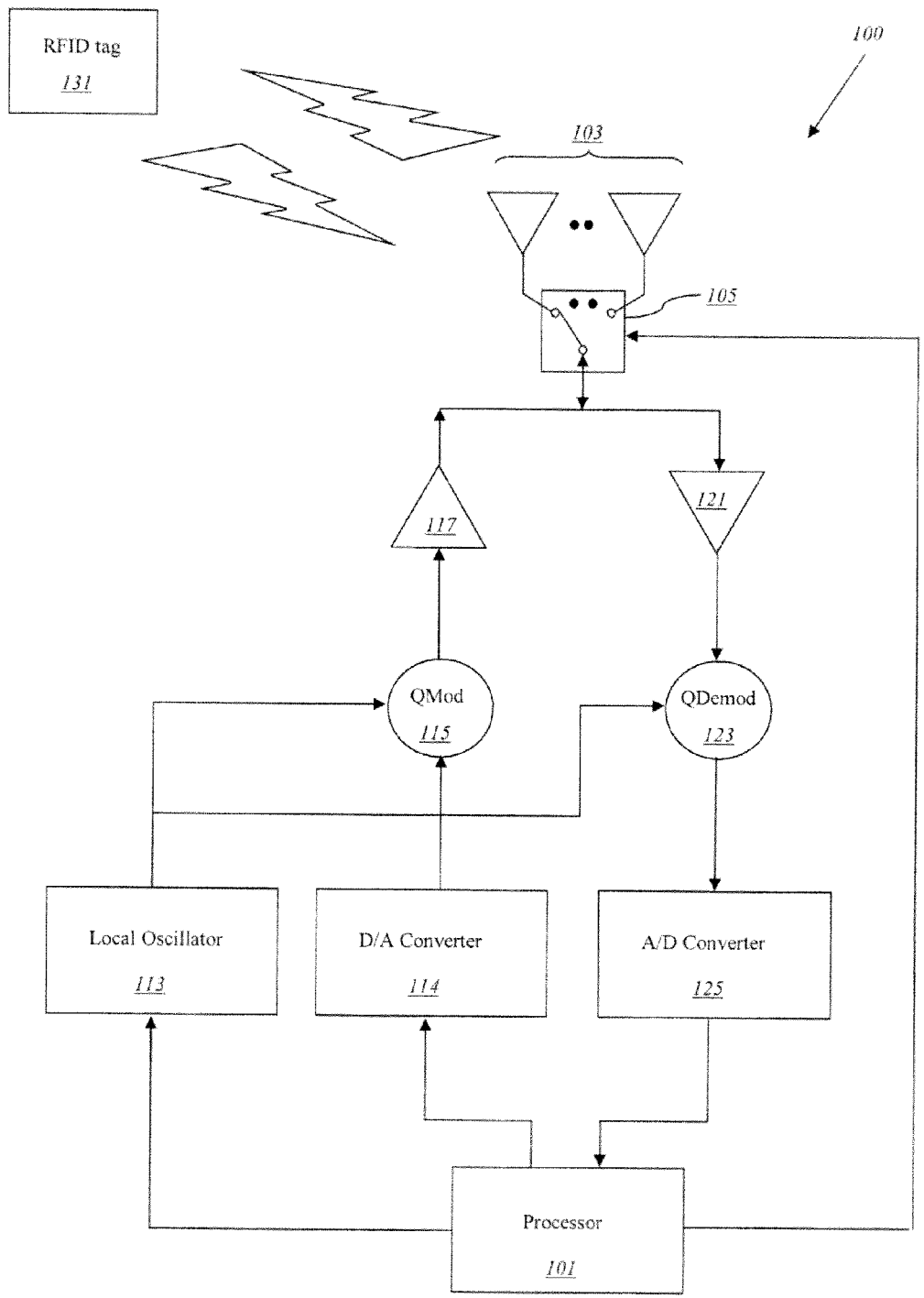
FIG. 1 is a block diagram illustrating an exemplary multi-mode RFID read device according to certain embodiments.

FIG. 1 is a block diagram illustrating an exemplary multi-mode RFID read device 100 according to certain embodiments. The device 100 includes a processor 101, a set of antennas 103, an antenna selection switch 105, a local oscillator 113, a digital-to-analog converter (DAC) 114, a modulator 115, an output amplifier 117, an input amplifier 121, a demodulator 123, and an analog-to-digital converter (ADC) 125. In certain embodiments, the modulator 115 and the demodulator 123 are a quadrature modulator and a quadrature demodulator, respectively.

A first output of the processor 101 is connected to a control input of the local oscillator 113, a second output of the processor 101 is connected to a digital input of the D/A converter 115, and a third output of the processor 101 is connected to a selection input of the antenna selection switch 105. A signal output of the local oscillator 113 is connected to a first (carrier) input of the quadrature modulator 115, and an analog output of the D/A converter 114 is connected to a second (modulation) input of the modulator 115. An output of the modulator 115 is connected to an input of the output amplifier 117, and an output of the output amplifier 117 is connected to a common terminal of the antenna selection switch 105. A set of selectable terminals of the antenna selection switch 105 are connected to the set of antennas 103. The common terminal of the antenna selection switch 105 is also connected to an input of the input amplifier 121. An output of the input amplifier 121 is connected to a first input of the quadrature demodulator 123. A second input of the demodulator 123 is connected to the signal output of the demodulator 123. An output of the demodulator 123 is connected to an analog input of the A/D converter 125. A digital output of the A/D converter 125 is connected to an input port of the processor 101.

The processor 101 is configured (e.g., programmed) to search and read multiple types of RFID tags. An exemplary search operation of the RFID read device 100 is now described. The processor 101 transmits a search signal over a plurality of RFID bands. As used herein "a search signal" can include a collection of RFID band search signals covering multiple RFID bands to be searched. For example, a search signal can include a first search signal for a first RFID hand, a second search signal for a second RFID band, and a third search signal for a third RFID band. By way of example, assume that the RFID read device 100 is designed to read three RFID bands, namely, 125 kHz, 13.56 MHz, and 915 MHz bands. The processor 100 transmits a first search signal for the 125 kHz band and searches for an indication of presence of an RFID tag. In the case of a passive RFID (e.g., a tag without its own power source), the tag presence indication can be in the form of a sudden drop in the energy of a reflected search signal due to short-circuiting of an antenna in an RFID tag If a tag presence indication is detected within the 125 kHz bandwidth, the processor 101 attempts to read the RFID tag by transmitting an interrogating or energizing signal in a target frequency (e.g., the frequency at which the tag presence is detected) in the manner to be described below.

A search signal for a particular RFID band can be a relatively broadband signal covering the band's entire bandwidth (e.g., from about 900 MHz to about 928 MHz for the 915 MHz band) transmitted at one time. Alternatively, a search signal can include a set of relatively narrowband search signals (e.g., slices) sequentially transmitted to sweep the entire bandwidth. The above steps are repeated for the other bandwidths, e.g., 13.56 MHz, and 914 MHz.

It should be noted that in certain embodiments, a plurality of antennas, such as the set of antennas 103 shown in FIG. 1, are provided. This is because a transceiver antenna that can transmit and receive a signal (e.g., a search or interrogating signal) in one RFID band can be different from a transceiver antenna that can transmit and receive a signal in another RFID band. For example, an antenna in the 13.57 MHz band can be a loop antenna designed to be responsive primarily to an RF magnetic field whereas an antenna for the 2.4 GHz band can be a dipole antenna designed to be responsive to an electric field. Accordingly, between searching or reading from one RFID band to another RFID band, it may be necessary to switch the transceiver antenna by providing, for example, a selection output from the processor 101 to the selection input of the antenna switch 105. In some embodiments, a single transceiver antenna having a fundamental frequency covering one of the plurality of RFID bands and one or more harmonic frequencies covering one or more remaining RFID bands can be used in place of a set of antennas 103 shown in FIG. 1 or in conjunction with one or more other antennas.

As indicated above, when the processor 101 detects presence of an RFID tag in a given bandwidth (e.g., 125 kHz), the processor 101 attempts to read the RFID tag by transmitting an interrogating or energizing signal. An exemplary read operation performed by the RFID device 100 is now described. The processor 101 outputs a signal indicative of a target frequency (e.g., the frequency at which the tag presence is detected) to the local oscillator 113. The local oscillator 113 is configured to respond to the signal from the processor 101 by generating a carrier signal oscillating at one of the frequencies associated with the multiple types of RFID tags that the device 100 is configured to handle. In certain embodiments, the local oscillator 113 is a phase-locked loop (PLL) synthesizer, which can generate a variety of output frequencies as multiples of a single reference frequency. In such embodiments, the signal indicative of the target frequency provided by the processor 101 can include data representing a multiplicative factor for the PLL synthesizer. In other embodiments, the local oscillator 113 may be a voltage controlled oscillator (VCO).

The processor 101 also generates a digital modulation signal that is based on a modulation scheme associated with the selected type of RFID tag. The modulation scheme can involve an amplitude-modulation, a frequency-modulation, or a combination of both. The modulation signal is fed into the DAC 114 which converts the digital modulation signal into an analog modulation signal. The analog modulation signal is also referred to as a "lower-frequency" signal or a "baseband" signal owing to the fact that the signal varies at a frequency that is typically lower than the frequency of the carrier signal.

The carrier signal (oscillating at the target frequency) generated by the local oscillator 113 and the analog modulation signal generated by the DAC 114 are fed into the modulator 115 which mixes the signals in an analog domain via an analog mixer (not shown) and generates a modulated "interrogating" or "energizing" signal to be transmitted to an RFID tag via the antenna 103 after being amplified by the output amplifier 117. The interrogating signal comprises the carrier signal modulated by the modulation signal. In some embodiments, the carrier signal is amplitude-modulated by the modulation signal. In other embodiments, the carrier signal is frequency-modulated by the modulation signal. The antenna 103 can be a loop antenna (with a single or multiple loops) having broadband characteristics to cover the range of frequencies associated with different types of RFID tags that the multi-mode RFID read device 100 is designed to handle.

The interrogating signal thus transmitted creates an electromagnetic (EM) field that induces an AC current in an antenna of a passive RFID tag shown in the drawing within the field, such as RFID tag 131, for example. This AC current is rectified and the resultant DC current then charges a capacitor in the tag 131. When the voltage signal on the capacitor is sufficient, an active electronic device in the tag circuit (not shown) is activated. Once activated, the electronic device in the tag shorts the tag antenna in a sequence of short intervals that is encoded to contain certain tag information, usually ID (e.g., an identifier character string) unique to the tag. The tag information may include, in addition to the unique ID, additional non-volatile information, such as price, quantity, or manufacturing data, associated with the article(s) to which the tag is attached. When the tag antenna is shorted, an additional load is created on the antenna 103 of the RFID read device 100 which induces a drop in voltage on the antenna 103. This response or "reflected" signal changes or induces a voltage signal at the antenna 103.

The above description relating to the RFID tag applies to passive RFID tags, which do not contain their own power sources and which reflect incoming interrogating signals in the manner described above. Active RFID tags, on the other hand, contain their own power sources and can actively generate response signals. It shall be appreciated by those skilled in the art in view of the present disclosure that the system and method disclosed herein can be equally applied to reading active RFID tags as well as passive RFID tags bearing in mind that the active RFID tags would receive an interrogating signal thus transmitted and actively generate a response signal, rather than merely reflecting the interrogating signal in the manner described above applicable to passive RFID tags. The actively generated response signal would be processed by the RFID device 100 in much the same way as described above.

Returning to FIG. 1, the voltage signal induced by the response signal is fed into the input amplifier 121 and then into the demodulator 123 along with the carrier signal oscillating at the target frequency output by the local oscillator 113. The output of the demodulator 123 is an intermediate frequency (IF) response signal. The IF response signal is then fed into the ADC 125 that converts the IF response signal into a digital response signal. The processor 101 receives the digital response signal and performs a digital signal processing operation including digitally filtering the digital response signal and decoding the tag information based on a decoding algorithm associated with the selected type of RFID tag. The processor 101 can then determine what tag(s) is(are) within the field region of the read device 100 and report this information as well as any other additional information contained in the response signal) to an inventory application or end user. The processor 101 can be programmed to switch frequencies by controlling the local oscillator 113 (e.g., PLL synthesizer) and to repeat the process for a new RF target frequency to implement a multi-mode RFID read device.

Figure 2:
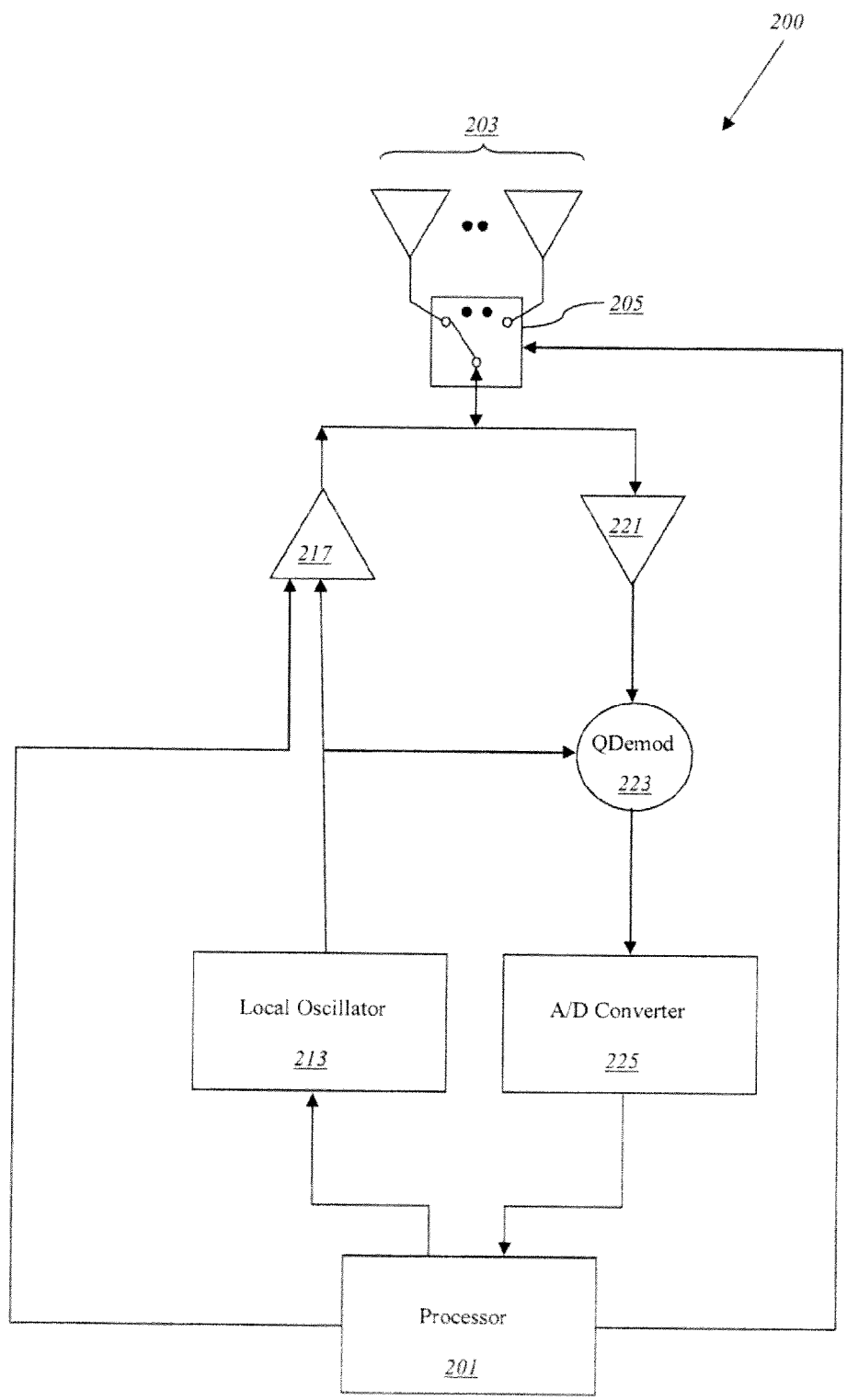
FIG. 2 is a block diagram illustrating another exemplary multi-mode RFID read device according to certain embodiments.

FIG. 2 is a block diagram illustrating another exemplary multi-mode RFID read device 200 according to certain embodiments. The device 200 includes a processor 201, a set of antennas 203, an antenna selection switch 205, a local oscillator 213, an output amplifier 217, an antenna 203, an input amplifier 221, a demodulator 223, and an analog-to-digital converter (ADC) 225.

Again, in certain embodiments, a description of the search operation (e.g., transmitting a series of search signals to detect presence of RFID tags in different RFID bands) for the RFID device 200 is substantially the same as that of the exemplary search operation for the RFID device 100 of FIG. 1 provided above and is not repeated here. Instead, an exemplary read operation of the RFID read device 200 is now described with emphasis placed on what is different from the read operation of the RFID read device 100.

In this device configuration, the processor 201 controls the local oscillator (e.g., a PLL synthesizer) which generates an RF carrier signal as described above. The RF carrier signal is fed into the output amplifier 217 which has a control input (e.g., an on-off input). The control input is configured to receive a digital modulation signal from the processor 201 to amplitude modulate the carrier signal. In certain embodiments, the output of the amplifier 217 is a digitally modulated interrogating signal, a simple example being an on-off keying (OOK) signal. In such digitally modulated interrogating signals, the signal power is kept large to indicate a binary "1" and small or zero to represent a binary "0". Alternatively, such digitally modulated interrogating signals can be generated by an amplifier in conjunction with a digitally-controlled analog switch. The output of the amplifier 217 is connected to the antenna 203, which transmits the modulated interrogating signal.

On the reception side, a response signal carrying tag information induces a voltage signal at the antenna 203, which voltage signal is fed into the input amplifier 221 and then demodulated by the demodulator 223 with the carrier signal. The demodulated response signal is fed into the ADC 225, which converts the demodulated response signal into digital representations of the response signal or more simply "a digital response signal." The digital response signal is then fed into the processor 201, wherein the digital response signal is digitally filtered and decoded to obtain the tag information encoded therein. This device configuration eliminates the need for a D/A converter and a modulator. As before, the processor 201 can be programmed to switch frequencies by controlling the local oscillator 213 (e.g., PLL synthesizer) and to repeat the process for a new RF frequency to implement a multi-mode RFID read device.

Figure 3:
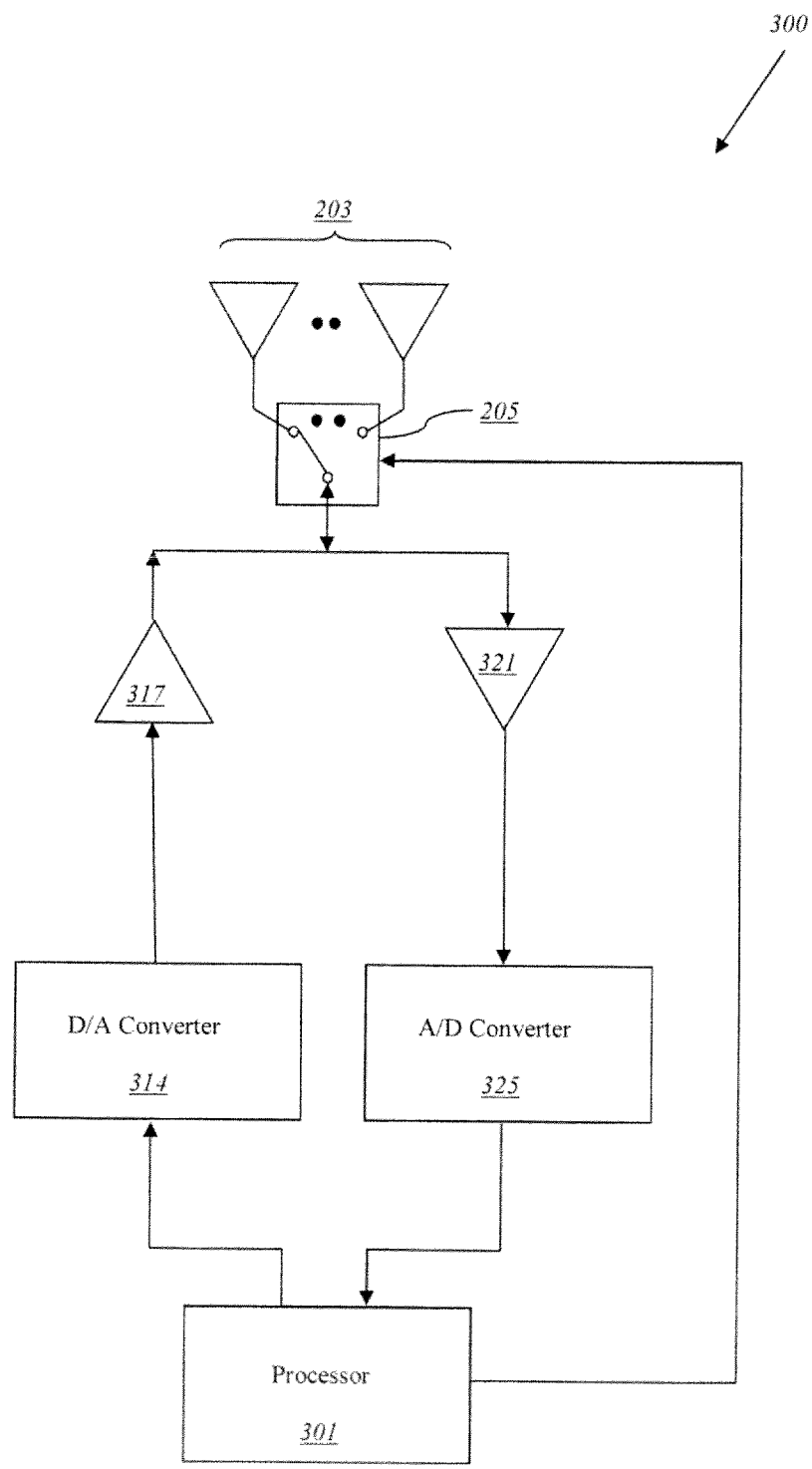
FIG. 3 is a block diagram illustrating yet another exemplary multi-mode RFID read device according to certain embodiments.

FIG. 3 is a block diagram illustrating another exemplary multi-mode RFID read device 300 according to certain embodiments. The device 300 includes a processor 301, a set of antennas 303, an antenna selection switch 305, a digital-to-analog converter (DAC) 314, an output amplifier 317, an antenna 303, an input amplifier 321, and an analog-to-digital converter (ADC) 325.

Again, in certain embodiments, a description of the search operation (e.g., transmitting a series of search signals to detect presence of RFID tags in different RFID bands) for the RFID device 300 is substantially the same as that of the exemplary search operation for the RFID device 100 of FIG. 1 provided above and is not repeated here. Instead, an exemplary read operation of the RFID read device 300 is now described with emphasis placed on what is different from the read operation of the RFID read devices 100 and 200.

In this device configuration, the processor 301 is of a sufficient speed and capability so as to directly generate digital representation of a modulated interrogation signal. In this configuration, the processor 301 can programmatically perform the modulation in digital domain versus analog domain as in the device configurations described above with respect to FIGS. 1 and 2. Alternatively, the device 300 may also include a memory (not shown) that is in data communication with the processor 301 and configured to store various sets of digital representations of modulated interrogating signals designed for different types of RFID tags. The processor 301 can then retrieve a particular set of digital representations corresponding to a selected RFID tag type to be read and the digital representations to be fed into the DAC 314, either directly from the memory or via the processor 301. The digital representations are converted to an analog modulated interrogating signal through the DAC 314. The interrogating signal can be either frequency or amplitude modulated depending on a particular modulation scheme employed. The modulated interrogating signal is then amplified and fed into the antenna 303 and transmitted.

On the reception side, a voltage signal at the antenna 303 induced by a response signal from an RFID tag is fed into the input amplifier 321 and into the ADC 325 and then directly into the processor 301. The processor 301 then digitally demodulates, filters, and decodes the signal to obtain the tag information. The carrier frequency of the modulated interrogating signal can be easily changed as it is directly controlled by the processor 301. This implementation is reduced in terms of the number of hardware components compared to the implementations of FIGS. 1 and 2, but requires higher-bandwidth components and a higher performance processor to handle additional functions performed in the digital domain. Such a high performance processor may include a digital media processor, model no TMS320DM6431 manufactured by Texas Instruments and having a processing speed of 2400 MIPS. However, this digital signal processor is exemplary only.

It shall be appreciated by those skilled in the art that the exemplary multi-mode RFID read devices shown in FIGS. 1-3 are provided for illustration purposes only, and should not be taken as limiting. For instance, some of the features of the illustrated examples can be mixed and matched. For example, in alternative embodiments, the modulation can be performed in the digital domain while the demodulation can be performed in the analog domain or vice versa.

Figure 4:
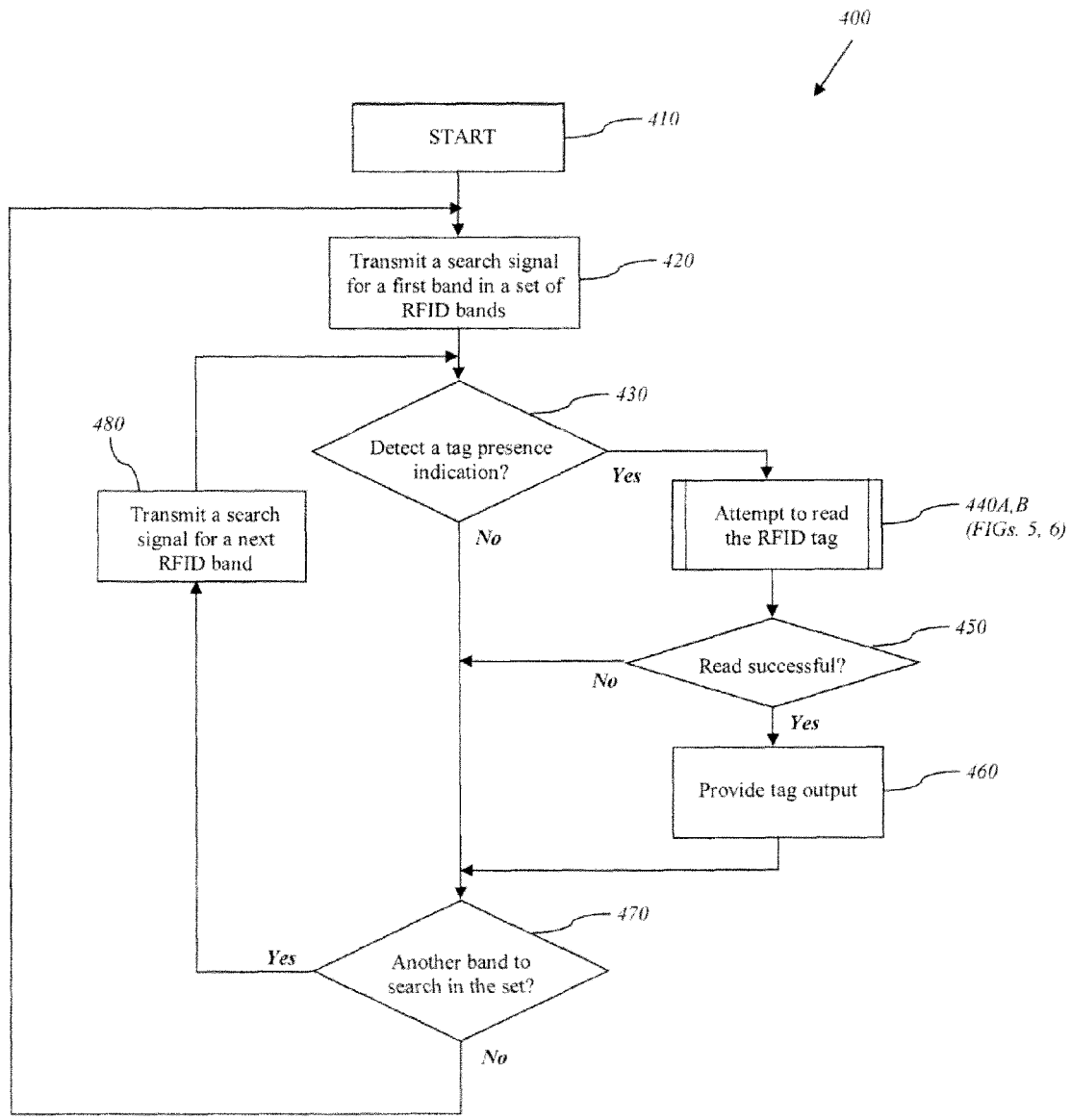
FIG. 4 is a flow chart illustrating an exemplary process for searching for and reading RFID tags in multiple RFID bands according to certain embodiments.

FIG. 4 is a flow chart illustrating an exemplary process for search and read operations of a multi-mode RFID read device according to certain embodiments. The process 400 starts at state 410 and proceeds to a state 420, in which a search signal for a first RFID band (e.g. 125 kHz) in a set of RFID bands (e.g., 125 kHz, 13.56 MHz, and 915 MHz bands) that the device is designed to read is transmitted. In certain embodiments, transmitting the search signal for a particular RED band includes transmitting one relatively broadband signal having a spectrum that substantially covers the band's entire bandwidth (e.g., from about 900 MHz to about 928 MHz for the 915 MHz band). In other embodiments, transmitting the search signal includes sweeping a frequency (e.g., transmitting a series of narrowband signals or "slices") substantially over the band's entire bandwidth. The choice of bands or portions of one or more bands that are searched, and hence the choice of search signals, may depend on the types of RFID tags being searched. For example, if it is known that RFID tags of interest are supported by only a certain spectral portion of a particular RFID band, the search signal can be configured to sweep or cover only that spectral portion instead of the entire bandwidth.

The process 400 proceeds to a decision state 420, in which a query is made as to whether a tag presence indication is detected in response to the transmitted search signal. In the case of a passive RFID tag, the indication can include a drop in the strength of the reflected search signal. In the case of an active RFID tag, the indication can include a "chirp" signal transmitted on the same or a different frequency by the active RFID tag. Tithe answer to the query at the decision state 430 is No (no tag presence indication detected), the process 400 proceeds to another decision state 470, in which a query is made as to whether there is another hand to search in the set of RFID bands to be read by the RFID read device. If the answer to the query at the decision state 430 is Yes (tag presence indication detected), the process 400 proceeds to a state 440A,B where an attempt is made to read a possible RFID tag. The read processes are described below with respect to FIGS. 5 and 6. After the read attempt, the process 400 proceeds to a decision state 450, in which a query is made as to whether the read was successful. If the answer to the query at the decision state 450 is Yes (read successful), the process 400 proceeds to a state 460, in which a tag output (e.g. ID for the RFID tag) is provided, for example, to a display or a database. After the tag output provision, the process 400 proceeds to a decision state 470. On the other hand, if the answer to the query at the decision state 450 is No (read unsuccessful), the process 400 proceeds to the decision state 470 without providing the tag output.

If the answer to the query at the decision state 470 is Yes (another band to search), the process 400 proceeds to a state 480, in which a search signal for the next. RFID band (e.g., 13.56 MHz) is transmitted and proceeds to the decision state 430 after searching or listening for a tag presence indication. On the other hand, if the answer to the query at the decision state 470 is No (no other band to search), e.g., because all bands in the set have been searched, the process 400 loops back to the state 420, in which a search signal for the first band (e.g., 125 kHz) is again transmitted and the remaining states described above are repeated.

Figure 5:
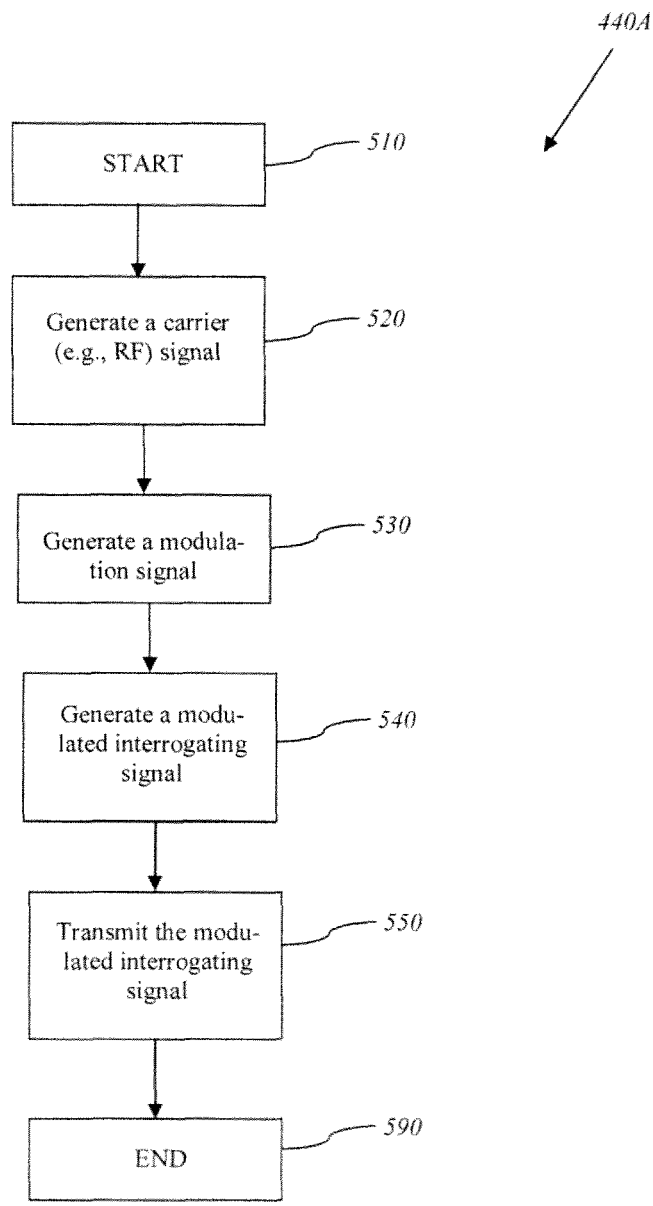
FIG. 5 is a flow chart illustrating an exemplary process for generating and transmitting a modulated interrogating signal to an RFID tag according to certain embodiments.

FIG. 5 is a flow chart illustrating an exemplary process 440A for generating and transmitting an interrogating signal to read an RFID tag according to certain embodiments. The process 440A starts at state 510 and proceeds to a state 520, in which a carrier signal (e.g., an RF signal) oscillating at a target frequency (e.g., the frequency at which the tag presence indication is detected) is generated. The carrier signal generation can be performed by a local oscillator which receives a signal indicative of the target frequency (e.g., data representing a multiplicative factor for a PLL synthesizer) from the processor as described above with respect to FIGS. 1 and 2.

The process 440A proceeds to a state 530, in which a modulation signal is generated. The modulation signal can be an analog modulation signal that is generated by a digital-to-analog converter (DAC) converting digital representations of a modulation signal provided by a processor as described above with respect to FIG. 1. Alternatively, the modulation signal can be a digital modulation signal output by a processor, which can be used to digitally modulate a carrier signal, as described above with respect to FIG. 2.

The process 440A proceeds to a state 540, in which a modulated interrogating signal is generated. In certain embodiments, this can be achieved by an analog modulator, such as the modulator 115 shown in FIG. 1, that mixes a carrier signal with an analog modulation signal as described above with respect to FIG. 1. In other embodiments, this can be achieved by an amplifier having an on-off control input or an amplifier in conjunction with a separate digitally-controlled analog switch as described above with respect to FIG. 2. In yet other embodiments, a modulated interrogating signal can be generated directly via a digital-to-analog conversion of digital representations as described above with respect to FIG. 3. In such embodiments, procedures performed at the states 520 and 530 may not be needed. The process 440A proceeds to a state 550, in which the modulated interrogating signal, after an amplification, is transmitted via an antenna such as a transceiver antenna in the set of antennas 103 shown in FIG. 1, for example. The process 440A ends at state 590.

Figure 6:
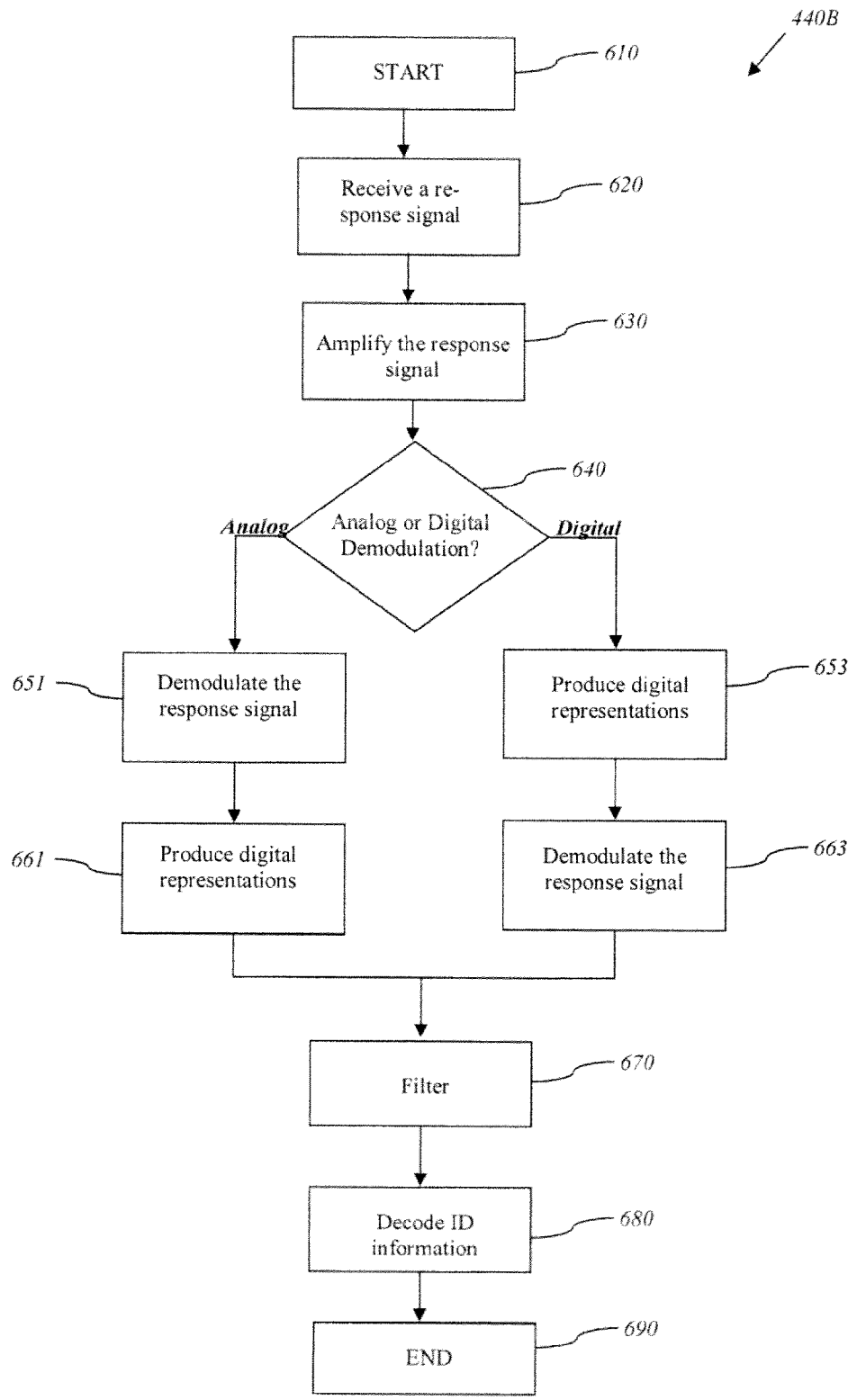
FIG. 6 is a flow chart illustrating an exemplary process for receiving and processing a response signal from an RFID tag according to certain embodiments.

FIG. 6 is a flow chart illustrating an exemplary process 440B for receiving and processing a response signal to read an RFID tag according to certain embodiments. The process 440B starts at state 610 and proceeds to a state 620, in which a response signal from an RFID tag is received by an antenna at a multi-mode RFID read device. The response signal may be a signal reflected from a passive RFID tag or a signal generated by an active RFID tag. The process 440B proceeds to a state 630, in which a voltage signal at the antenna induced by the response signal is amplified. The process 440B then proceeds to a decision state 640, in which a query is made as to whether the response signal is to be demodulated in an analog domain, e.g., by a dedicated hardware demodulator, as in FIGS. 1 and 2; or in a digital domain, e.g., by a processor, as in FIG. 3. This decision state is provided for illustrating two types (analog and digital) of demodulation, and it shall be appreciated that such a query is typically not made in a particular embodiment of the multi-mode RFID read device. This is because such a device is likely to be preconfigured for either an analog or digital modulation operation.

If the answer to the query at the decision state 640 is "analog" (analog demodulation embodiments), the process 440B enters an analog demodulation branch and proceeds a state 651, in which the amplified response signal is demodulated in the analog domain, e.g., by a dedicated analog demodulator such as the demodulators 123, 223 shown in FIGS. 1 and 2. In the analog demodulation branch, the process 440B further proceeds to a state 661, in which a digital response signal (e.g., digital representations of the demodulated response signal) is produced, e.g., by an analog-to-digital converter (ADC) such as the ADCs 125, 225 shown in FIGS. 1 and 2.

On the other hand, if the answer to the query at the decision state 640 is "digital" (digital demodulation embodiments), the process 440B enters a digital demodulation branch and proceeds to a state 653, in which, the amplified response signal is converted into a digital response signal (e.g., digital representations of the response signal) by an ADC such as the ADC 325 shown in FIG. 3. In the digital modulation branch, the process 440B proceeds to a state 663, in which the digital response signal is digitally demodulated by a processor as described above with respect to FIG. 3.

For both analog and demodulation embodiments, the process 440B converges at a state 670, in which the digital response signal (which is now demodulated) is subjected to a digital filtering process by a processor. The type of digital filtering applied depends on the type of RFID tag being read and its associated frequency and encoding scheme. The process 440B proceeds to a state 680, in which the processor decodes the demodulated and filtered digital response signal to obtain tag information encoded therein. The process 440B ends at state 690.

It shall be appreciated by those skilled in the art that the exemplary processes shown in FIGS. 4-6 are provided for illustration purposes only, and should not be taken as limiting. For instance, referring to FIG. 5, the generation of the modulation signal at the state 530 is performed typically at the same time as the generation of the carrier signal at the state 520. In some embodiments similar to those illustrated in FIG. 3, the states 520 and 530 can be eliminated. Referring to FIG. 6, the digital demodulation at the state 663 can be performed after or at the same time as the digital filtering at the state 670, for example.

Figure 7:
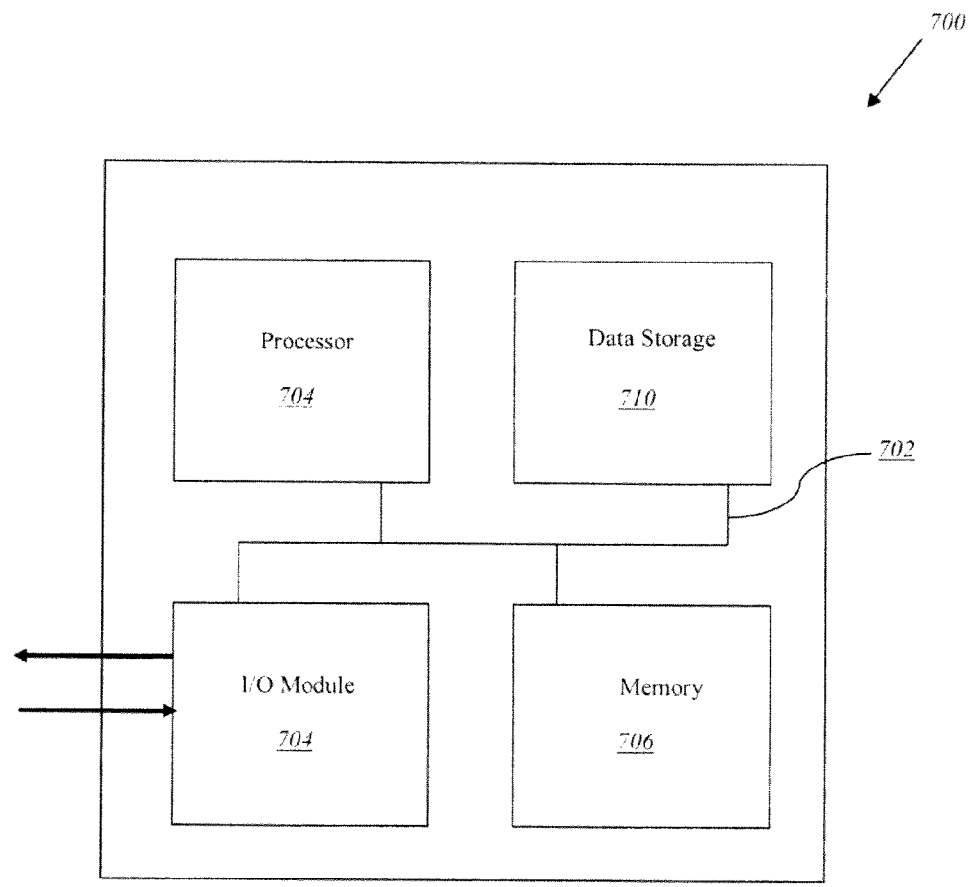
FIG. 7 is a block diagram illustrating a computer system upon which certain embodiments may be implemented.

FIG. 7 is a block diagram that illustrates an exemplary computer system 700 upon which certain embodiments disclosed herein may be implemented. Computer system 700 includes a bus 702 or other communication mechanism for communicating information, and a processor 704 coupled with bus 702 for processing information. Computer system 700 also includes a memory 706, such as a random access memory ("RAM") or other dynamic storage device, coupled to bus 702 for storing information and instructions to be executed by processor 704. Memory 706 may also be used for storing temporary variables or other intermediate information during execution of instructions by processor 704. Computer system 700 further includes a data storage device 710, such as a magnetic disk or optical disk, coupled to bus 702 for storing information and instructions.

Computer system 700 may be coupled via I/O module 708 to a display device (not illustrated), such as a cathode ray tube ("CRT") or liquid crystal display ("LCD") for displaying information to a computer user. An input device, such as, for example, a keyboard or a mouse may also be coupled to computer system 700 via I/O module 708 for communicating information and command selections to processor 704.

According to certain embodiments, certain aspects of generating a modulated interrogating signal and processing a response signal from an RFID tag are performed by a computer system 700 in response to processor 704 executing one or more sequences of one or more instructions contained in memory 706. Processor 704 may be a microprocessor, a microcontroller, and a digital signal processor (DSP) capable of executing computer instructions. Such instructions may be read into memory 706 from another machine-readable medium, such as data storage device 710. Execution of the sequences of instructions contained in main memory 706 causes processor 704 to perform the process steps described herein. One or more processors in a multi-processing arrangement may also be employed to execute the sequences of instructions contained in memory 706. In alternative embodiments, hard-wired circuitry may be used in place of or in combination with software instructions to implement various embodiments. Thus, embodiments are not limited to any specific combination of hardware circuitry and software.

The term "machine-readable medium" as used herein refers to any medium that participates in providing instructions to processor 704 for execution. Such a medium may take many forms, including, but not limited to, non-volatile media, volatile media, and transmission media. Non-volatile media include, for example, optical or magnetic disks, such as data storage device 710. Volatile media include dynamic memory, such as memory 706. Transmission media include coaxial cables, copper wire, and fiber optics, including the wires that comprise bus 702. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM. DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The foregoing description is provided to enable any person skilled in the art to practice the various embodiments described herein. While the foregoing embodiments have been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of reading a radio frequency identification (RFID) tag, the method comprising:
   transmitting a search signal comprising a broadband signal covering the entire bandwidth of an RFID band;
   selecting a target frequency in the RFID band based on a response to the search signal;
   generating in a processor a digital representation of an interrogating signal, the interrogating signal comprising a baseband signal and a carrier signal having the selected target frequency;
   converting the digital representation of the interrogating signal to an analog signal in a digital-to-analog converter (DAC);
   providing the analog signal to a selected antenna from one of at least two antennas, a first one of the at least two antennas associated with the RFID band and a second one of the at least two antennas associated with a different RFID band;
   broadcasting the analog signal using the selected antenna;
   detecting a response from the RFID tag by measuring a change in a voltage on the selected antenna; and
   reading the RFID tag.

2. The method of claim 1, wherein broadcasting the interrogating signal comprises providing the analog signal to the selected antenna.

3. The method of claim 1, further comprising converting the measured change in the voltage on the selected antenna to a digital signal in an analog-to-digital converter (ADC).

4. The method of claim 3, wherein reading the RFID tag comprises:
   receiving the digital signal with the processor; and
   demodulating with the processor the digital signal using the carrier signal having the target frequency;
   wherein reading the RFID tag comprises decoding of the demodulated digital signal.

5. The method of claim 1, wherein the target frequency is selected from RFID bands that are associated with target frequencies of 125 kHz, 13.56 MHz, 915 MHz, and 2.4 GHz.

6. The method of claim 1, further comprising selecting a second target frequency based on a second response to the search signal.

7. A radio frequency identification (RFID) device comprising:
   first and second antennas respectively associated with first and second RFID bands;
   a digital-to-analog converter (DAC) having an output and an input;
   an analog-to-digital converter (ADC) having an input and an output;
   an antenna selection switch coupled to the output of the DAC and the input of the ADC and selectably coupled to one of the first and second antennas; and
   a processor operatively coupled to the antenna selection switch and having an output connected to the input of the DAC and an input connected to the output of the ADC, the processor configured to:
      configure the first antenna to transmit a first search signal comprising a first broadband signal covering the first RFID band;
      configure the second antenna to transmit a second search signal comprising a second broadband signal covering the second RFID band;
      determine a selected target frequency in the first RFID band or the second RFID band based on a response to the first and second broadband signals;
      configure the antenna selection switch to select one of the first and second antennas based on the selected target frequency;
      provide a first digital signal on the processor output that comprises a digital representation of a modulated interrogating signal comprising a carrier frequency signal modulated by a baseband signal at the target frequency;
      receive a second digital signal on the processor input;
      demodulate the second digital signal to remove the carrier frequency signal; and
      decode the demodulated second digital signal.

8. The device of claim 7, wherein:
   the processor comprises a memory configured to store a plurality of digital representations of modulated interrogating signals; and
   the processor is further configured to retrieve one of the plurality of digital representations of modulated interrogating signals and provide the retrieved one of the plurality of digital representations of modulated interrogating signals as the first digital signal.

9. The device of claim 7, wherein the selected target frequency is selected from RFID bands that are associated with target frequencies of 125 kHz, 13.56 MHz, 915 MHz, and 2.4 GHz.

10. The device of claim 9, wherein the processor comprises a memory configured to store a plurality of sets of information respectively associated with a plurality of types of RFID tags, each set comprising a respective encoding scheme and a RFID frequency band.

11. The device of claim 10, wherein the memory comprises first and second sets of information associated with first and second RFID tags having different RFID bands.

12. The device of claim 11, wherein the different RFID bands comprise 125 kHz, 13.56 MHz, 915 MHz, and 2.4 GHz bands.

13. The device of claim 7, wherein the input of the ADC receives a voltage on the first or second antenna, wherein a change in the voltage represents a signal reflected from a passive RFID tag.

14. The device of claim 7, wherein the input of the ADC receives a voltage on one of the first and second antennas, wherein a change in the voltage represents a signal generated by an active RFID tag.

15. The device of claim 7, wherein one of the first and second antennas comprises a set of transceiver antennas, each of the transceiver antennas configured to transmit and receive a signal in a different RFID band.

16. The device of claim 7, wherein one of the first and second antennas comprises a single transceiver antenna having a fundamental frequency covering one of the first and second RFID bands and one or more harmonic frequencies covering one or more remaining RFID bands.

17. A radio frequency identification (RFID) device comprising:
- at least two antennas respectively associated with at least two RFID bands associated with first and second target frequencies wherein the first target frequency is at least twice the second target frequency;
- a modulator having an output and first and second inputs;
- a demodulator having a first input and a second input and an output;
- an antenna selection switch coupled to the output of the modulator and the first input of the demodulator and selectably coupled to one of the at least two antennas;
- a local oscillator having an output connected to the first input of the modulator and the second input of the demodulator, the oscillator configured to provide an analog carrier signal at an operational frequency selected from the at least two RFID bands and to accept a signal indicative of the operational frequency;
- a digital-to-analog converter (DAC) having an output connected to the second input of the modulator and an input;
- an analog-to-digital converter (ADC) having an input connected to the output of the demodulator and an output; and
- a processor operatively coupled to the antenna selection switch and having a first output connected to an input of the oscillator, a second output connected to the input of the DAC, and an input connected to the output of the ADC, the processor configured to:
  - configure one of the at least two antennas to transmit a search signal comprising a broadband signal covering the entire bandwidth of one of the at least two RFID bands;
  - determine the operational frequency based on a response to the search signal;
  - provide the signal indicative of the operational frequency on the first output;
  - configure the antenna selection switch to select one of the at least two antennas that is associated with the operational frequency;
  - provide a baseband signal on the second output;
  - receive a digital signal on the input; and
  - decode the digital signal.

18. The device of claim 17, wherein the local oscillator comprises a phase-locked loop (PLL) synthesizer.

19. The device of claim 17, wherein the modulator provides on the output an analog modulation signal that is a quadrature-encoded signal.

20. The device of claim 17, wherein the modulator provides on the output an analog modulation signal that comprises a frequency modulation of the carrier signal.

21. The device of claim 17, wherein the modulator provides on the output an analog modulation signal that comprises an amplitude-modulation of the carrier signal.

22. The device of claim 17 wherein the operational frequency is selected from target frequencies of 125 kHz, 13.56 MHz, 915 MHz, and 2.4 GHz.

* * * * *